Figure 7:
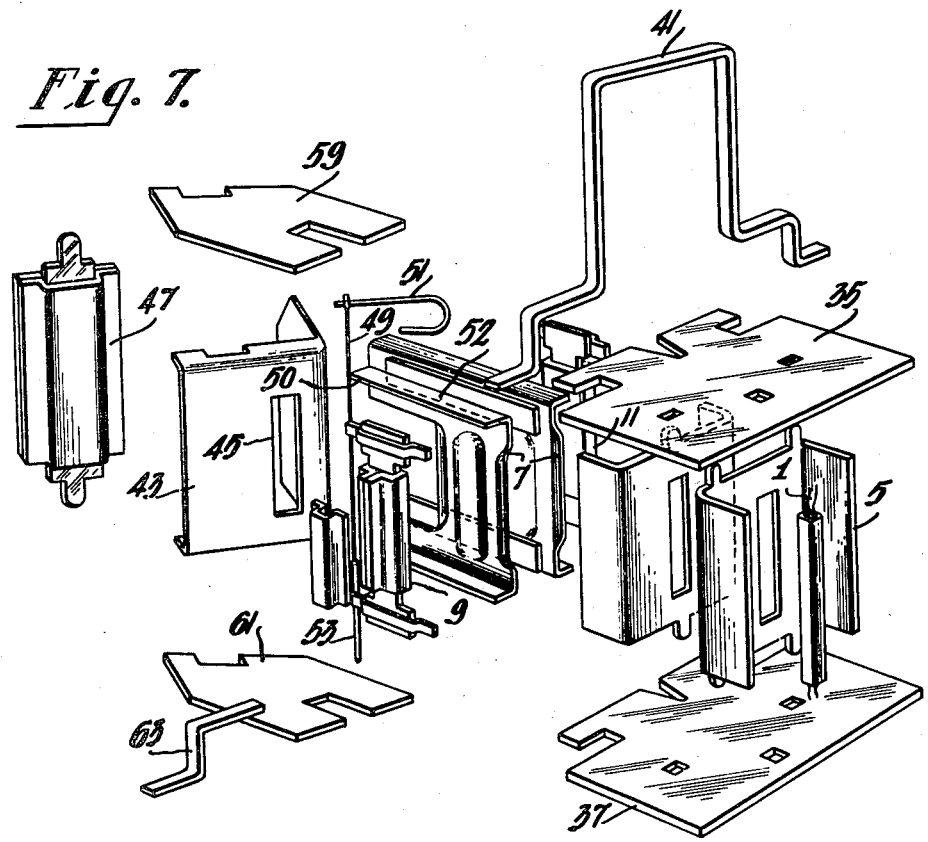

Oct. 19, 1948.                L. E. NORTON                2,451,769
         ELECTRONIC SYSTEM FOR MEASURING MICROWAVE
                TRANSMISSION THROUGH A WAVEGUIDE
Filed June 11, 1945                              4 Sheets-Sheet 1
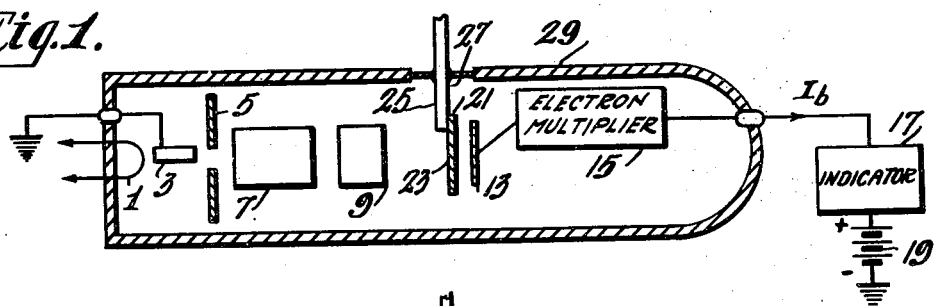
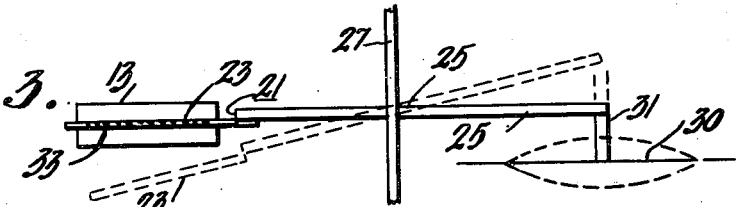
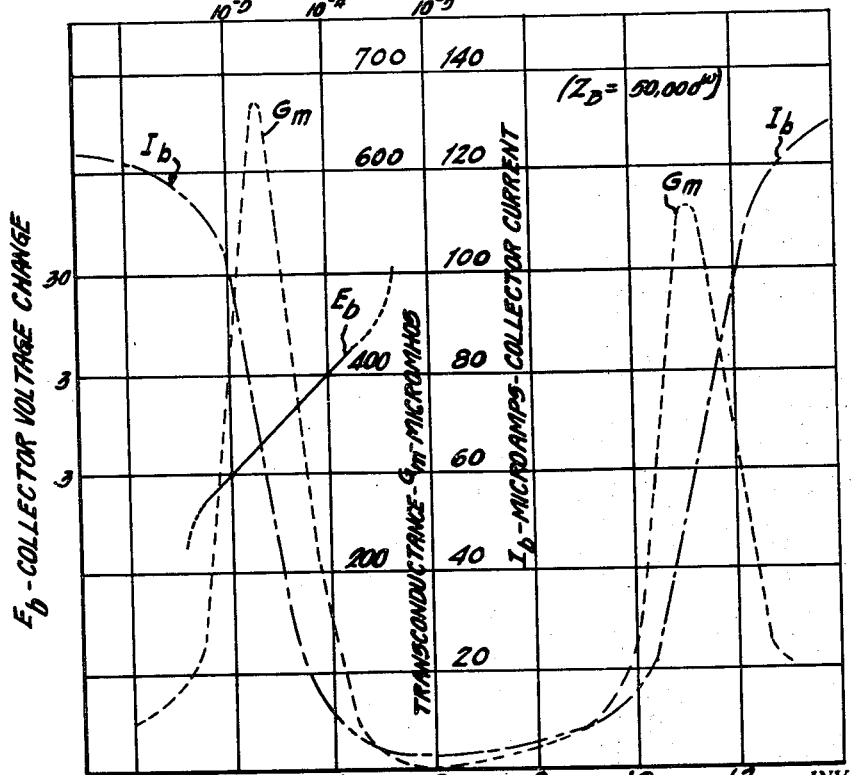
INVENTOR.
LOWELL E. NORTON
BY
ATTORNEY Inventor
LOWELL E. NORTON Oct. 19, 1948.    L. E. NORTON    2,451,769
ELECTRONIC SYSTEM FOR MEASURING MICROWAVE
TRANSMISSION THROUGH A WAVEGUIDE
Filed June 11, 1945    4 Sheets-Sheet 3

Inventor
LOWELL E. NORTON

By C. D. Tuska
Attorney

INVENTOR.
LOWELL E. NORTON
BY
ATTORNEY

Patented Oct. 19, 1948

2,451,769

UNITED STATES PATENT OFFICE 2,451,769

ELECTRONIC SYSTEM FOR MEASURING MICROWAVE TRANSMISSION THROUGH A WAVE GUIDE

Lowell E. Norton, Princeton Junction, N. J., assignor to Radio Corporation of America, a corporation of Delaware Application June 11, 1945, Serial No. 598,740

5 Claims. (Cl. 171—95)

This invention relates generally to electronic detectors and more particularly to an improved device for detecting and measuring extremely small mechanical displacements or vibrations.

Briefly, the instant invention comprises an improved electronic detector comprising a thermionic discharge tube having means for generating a thin sheet of electrons which is focused upon a secondary-electron-emissive collector electrode, and in which a light movable shutter is interposed between the focused electron source and the electron collector. The movable shutter is mechanically coupled to an external device, of which the mechanical displacement is to be detected, by means of a flexible diaphragm set into the evacuated envelope of the tube. Since the electron beam is focused to an extremely thin sheet, and since the shutter when at rest normally interrupts substantially all electron transmission to the collector electrode, very slight displacements of the shutter provide relatively high collector current and collector voltage variations.

One application of the invention is in the detection of mechanical vibrations of small magnitude. Another application is in seismographic measurements wherein the discharge tube envelope is suspended and cushioned in a high inertia support in a manner whereby earth vibrations are transmitted substantially only to the movable shutter. A third application of the invention is in the detection and measurement of microwave transmission through waveguides or coaxial transmission lines in combination with the devices disclosed in applicant's copending application Serial No. 598,739, filed June 11, 1945. In said copending application the microwave fields propagated along a waveguide or coaxial line provide mechanical displacement of a thin conductive diaphragm forming a portion of the guiding means. The improvement comprising the instant invention includes the combination of such a wave responsive diaphragm with the vibration detecting tube disclosed herein for measuring in an extremely sensitive and efficient manner the energy propagated along said guiding means.

Among the objects of the invention are to provide improved methods of and means for measuring minute mechanical displacements or vibrations. Another object is to provide an improved vibration detector comprising a thermionic tube having a movable shutter enclosed within the tube envelope and coupled through a flexible diaphragm in said envelope to an external source of vibrations for interrupting the tube electron beam as a function of the vibration amplitude. A further object of the invention is to provide an improved method of and means for measuring microwave energy propagated along a waveguide or coaxial transmission line by utilizing a flexible conductive element forming a portion of the wave guiding means and responsive to the microwave fields and an electron discharge tube having an electron shutter responsive to displacement of said diaphragm for generating an electric current proportional to the magnitude of said microwave fields. An additional object of the invention is to provide a more efficient and sensitive means for detecting and measuring mechanical vibration. A still further object of the invention is to provide an improved vibration detector adaptable to seismographic measurements.

Figure 2:
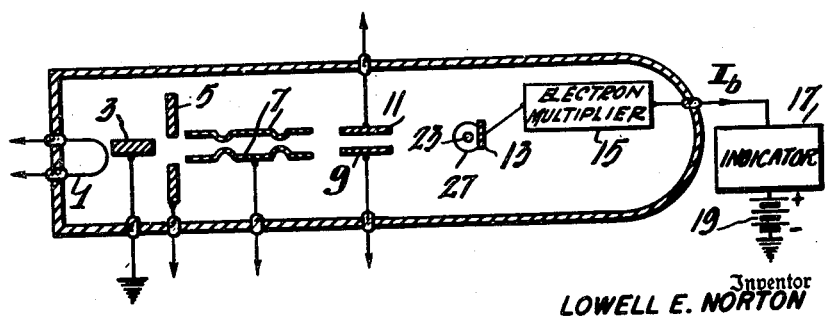
Figure 4:
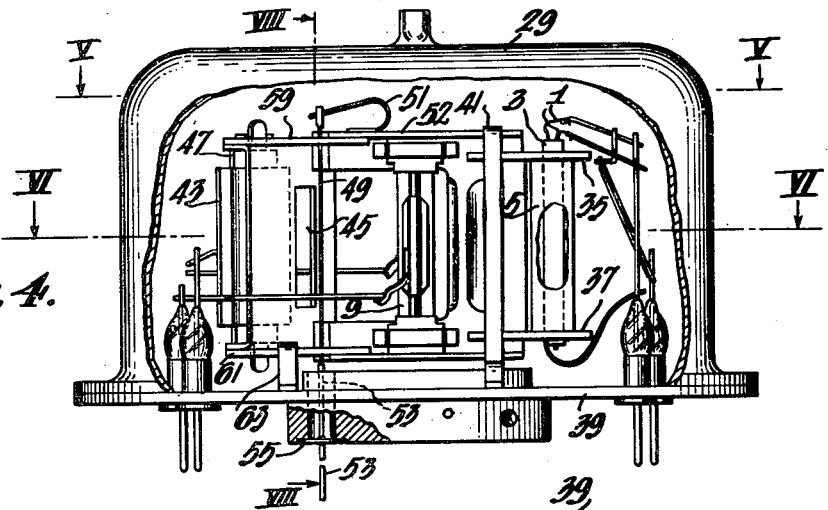
Figure 5:
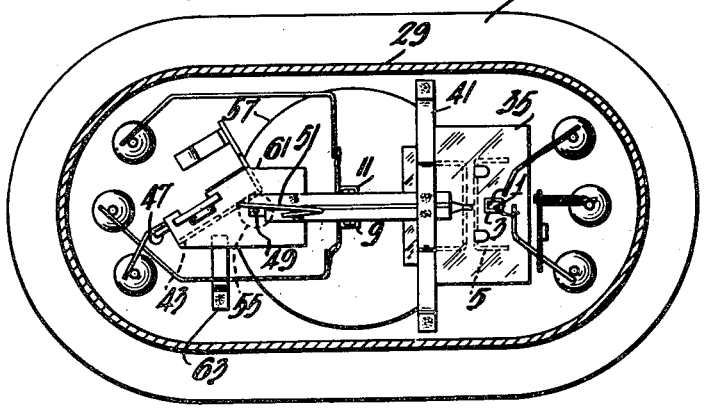
Figure 6:
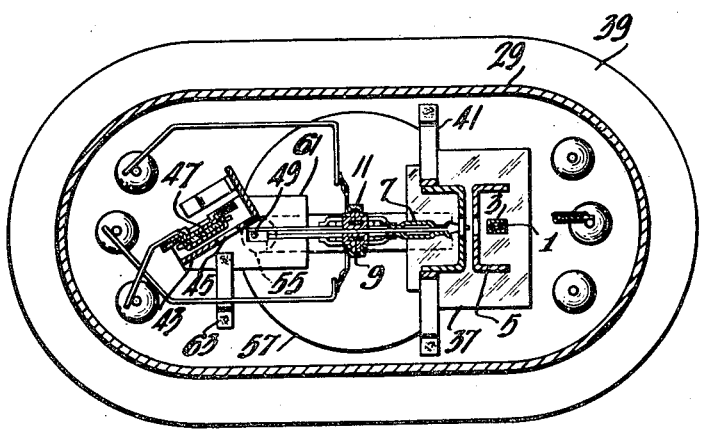
Figure 8:
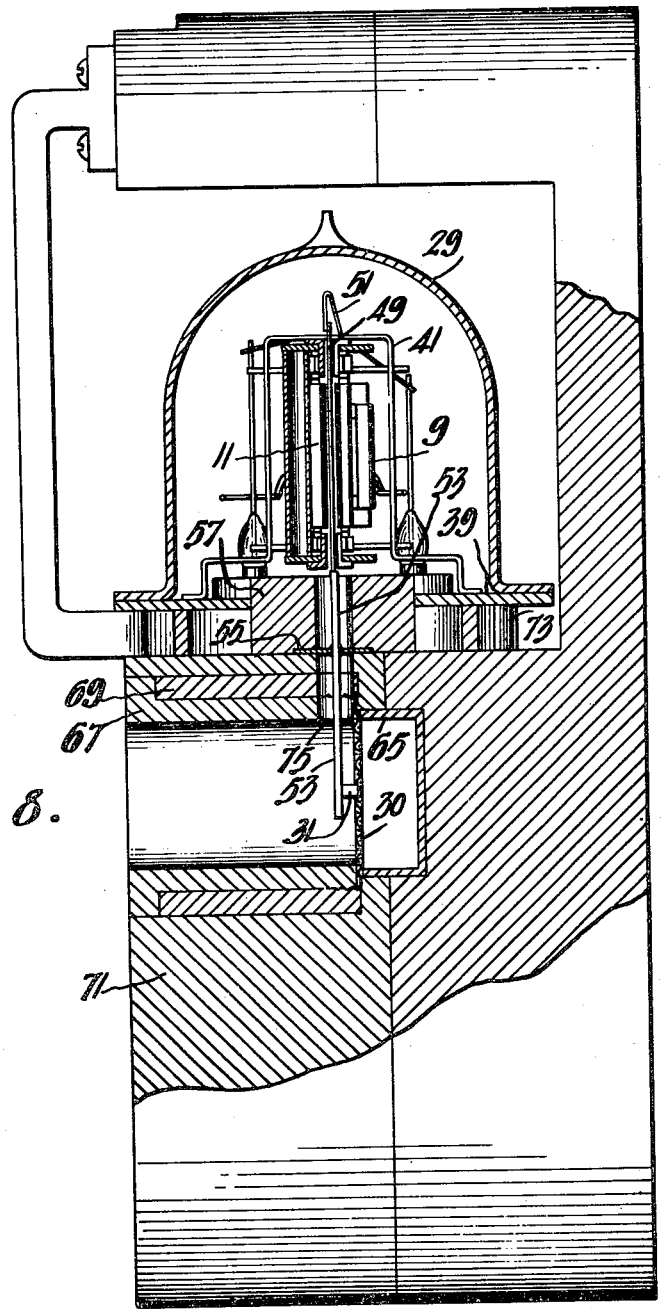

The invention will be described in greater detail by reference to the accompanying drawings of which Figure 1 is a schematic cross-sectional elevational view showing the basic components of the vibration responsive thermionic tube, Figure 2 is a schematic cross-sectional plan view of said basic features of said tube, Figure 3 is an enlarged schematic diagram of the vibration-responsive movable mechanical elements of said tube, Figure 4 is a partially cross-sectional, elevational view of a preferred embodiment of said tube, Figure 5 is a cross-sectional plan view of said preferred embodiment of said tube taken along the section line V—V, Figure 6 is a cross-sectional plan view of said preferred embodiment of said tube taken along the section line VI—VI, Figure 7 is an exploded perspective view of the principal elements of said preferred embodiment of said tube, Figure 8 is a partially cross-sectional view of a second embodiment of the invention adapted to measurements of microwave energy propagated along a waveguide, and Figure 9 is a family of graphs illustrative of the operating characteristics of the invention. Similar reference characters are applied to similar elements throughout the drawings.

Referring to Figures 1, 2 and 3, a thermionic heater element 1 supplied by currents derived from an external source (not shown) energizes an indirectly-heated cathode 3 which emits electrons. The electrons from the cathode 3 are formed into a constricted beam by means of an apertured limiting electrode 5 and thence are focused into an extremely thin flat beam by means of focusing electrodes 7 which, if desired, may be biased by a source of potential (not shown). The focused beam of electrons impinges upon a collector electrode 9 which, in conjunction with an electron multiplier 11 of any rpe, provides an output current I_b through
itor 17 connected to a source of collector
19.
able shutter 21 comprising a fine wire
1 is normally disposed in the path of the
beam intermediate the electron beam
means and the collector electrode, in-
relatively heavier portion 25 which passes
a flexible diaphragm 27 forming a por-
he envelope 29 of the thermionic tube.
ry portion of the shutter external of the
m may be coupled to any external de-
iding a source of vibrations to be meas-
he focused electron beam derived from
sing electrodes 7 passes between beam
; electrodes 9 and 11 which may be biased
:ring the electron beam upon the thin
:ion 23 of the shutter 21, whereby the
beam is normally shielded from the col-
ctrode 13. It should be understood that
wire portion 23 of the shutter 21 should
cross-section slightly larger than the
:ion of the focused electron beam at
' of the shutter.
3 is an enlarged view of the movable
l and the diaphragm 27 showing the
t of the fine wire portion 23 of the shut-
h respect to the collector electrode 13 in
to displacement of an external dia-
element 30 which is coupled through a
I to the external end of the heavy shut-
n 25. The portion of the figure shown
ines indicates the relative displacement
ments in response to vibrations of the
diaphragm or element 30. The fine
e 33 shown on the fine wire portion 23
vable shutter and coinciding with the
the collector electrode 13 indicates the
ectron beam which is normally shielded
collector electrode 13.
4, 5, 6 and 7 show the construction of
d embodiment of the vibration-respon-
vherein the indirectly heated cathode 3,
:ing electrode 5, beam focusing electrode
im deflecting electrodes 9 and 11 are
by upper and lower brackets 35 and 37
held to a base 39 by means of a U-
rap 41. A V-shaped vertical shield
13 having a rectangular aperture 45 is
jacent to the end of the beam deflect-
des 9 and 11 remote from the cathode 3.
igular aperture 45 exposes a secondary-
nissive collector electrode 47 to elec-
iation when the vibration-responsive
deflected.
tter comprises the fine wire 49 which
d at its upper end by means of a spring
1 to the upper side of one of the brack-
which project from the focusing elec-
id which support and align the beam
electrodes. The lower end of the fine
r 49 is fastened to a heavier wire por-
ich passes through, and is sealed to, a
lic diaphragm 55 which is sealed into
nter portion 57 of the base 39. The
ortion 49 of the shutter is centered in
'e 45 of the shield electrode 43 by pre-
ljustment of the supporting spring 51
iaintained under constant tension by
aid spring. The secondary-electron-
llector 47 and the shield electrode 43
relatively fixed positions by means of a
9 and bottom plate 61 to which the
ire crimped. The bottom plate 61 is held to the base plate 39 by means of an angle
bracket 63 which is spot welded thereto.

The secondary-electron-emissive collector 47
and the shielding electrode 43 comprise a single
stage electron multiplier which increases the elec-
tron efficiency of the tube by a factor of about 4.
After preliminary adjustment of the position and
tension of the supporting spring 51, the assembly
of the tube is completed and it is evacuated. Sub-
sequent adjustment of the tube is obtained by
varying the deflection voltage applied to the de-
flection electrodes 9 and 11 for centering the
focused electron beam upon the fine wire portion
45 of the shutter when it is at rest. External
terminals in the base of the tube are provided for
the heater 1, the cathode 3, the beam deflecting
electrodes 9 and 11, and the secondary-electron-
emissive collector 47 for applying suitable operat-
ing voltages thereto. If desired, other terminals
may be provided for the limiting electrode 5 and
focusing electrodes 7. However, the limiting,
focusing and apertured shield electrodes have
been found to operate satisfactorily when ground-
ed to the base plate 39.

In Figure 8 the vibration detecting tube de-
scribed heretofore by reference to Figures 4, 5,
6 and 7 is shown coupled by means of the external
shutter portion 55 and coupling link 31 to a thin
metallic diaphragm 30 forming a portion of one
of the wide faces of a conventional rectangular
waveguide 65. The diaphragm 30 comprises, for
example, a circular screen of the order of 1000
mesh and having a thickness of .2 mil. For some
applications the diaphragm may be a solid thin
film. The diaphragm 30 is stretched at one end
of a pair of telescopic supporting rings 67 and 69
which fit into a heavy bracket 71 which supports
both the waveguide 65 and the vibration detecting
tube. The heavy base portion 57 of the tube is
fitted into a conventional tube socket 73 which
also is supported by the heavy bracket 71. For
the sake of simplicity the socket connections or
contacts are not shown. An aperture 75 in the
side of the telescopic rings 67 and 69 and bracket
71 permits the heavy external portion 53 of the
tube shutter to be coupled to the linkage 31 fas-
tened to the center of the waveguide diaphragm
30.

As explained in applicant's copending applica-
tion identified heretofore, the microwave fields of
the wave propagated along the waveguide 65 pro-
vide mechanical displacement or deformation of
the thin waveguide diaphragm 30 thereby pro-
viding vibrations responsive to the microwave
pulses or modulation which are transmitted
through the elements 31, 53, 55 to displace the
fine wire shutter 49 with respect to the electron
beam normally focused thereon. The displace-
ment of the shutter permits the beam to reach
the secondary-electron-emissive collector elec-
trode 47 and provides a collector current or volt-
age which is a function of the microwave energy
propagated along the waveguide.

Since the vibration-detecting tube with its
built-in electron multiplier is extremely sensi-
tive, the collector current $I_b$ will probably be of
sufficient magnitude to actuate directly the indi-
cator 17 connected in series with the collector
voltage supply. However, since the tube im-
pedance is relatively high, for example 50,000
ohms, the output voltage also will be sufficiently
high to actuate efficiently subsequent amplifiers
or voltage responsive indicating devices of known
types.

Figure 9 is illustrative of the operating characteristics of the tube. The dash line graph $G_m$ illustrates the collector-to-cathode transconductance as a function of the beam deflecting voltage applied to the deflecting elements 9 and 11. The broken line curve $I_b$ shows the corresponding variation in collector current. It is seen that a variation of one-tenth volt in beam deflection potential provides a change of 65 microamperes in collector current. Since the beam deflection sensitivity of tubes of this type is of the order of .004 inch per volt, a collector current change of 65 microamperes is provided by a corresponding deflection of the electron beam of .0004 inch. It follows that if the electron beam is not deflected, but if the fine wire shutter 23 is mechanically displaced a distance of .001 inch, a collector current change of 163 microamperes will result. Since the single stage electron multiplier disclosed herein provides a gain of the order of 4, the total current sensitivity will be of the order of 650 microamperes per .001 inch of displacement of the fine wire shutter 23.

Since a tube of this type may be readily constructed to operate with a collector impedance $Z_b$ of the order of 50,000 ohms, it follows that the output voltage sensitivity of the device will be of the order of 30 volts per .001 inch deflection of the fine wire shutter 23. The voltage sensitivity v. shutter displacement is indicated by the solid line graph $E_b$ which indicates a collector voltage change of .3 volt for a shutter displacement of .00001 inch.

Due to the extremely high sensitivity of the device, it is desirable that its frequency characteristics as determined by the shutter size, tension, and mass and by the natural period of the envelope diaphragm and the external linkage, be such that its response is highly selective to the vibration frequency to be detected in order that other spurious or fictitious frequencies may provide a minimum of noise signal output. The device, however, is not unusually sensitive to operating voltage variations since it is the relative mechanical displacement of the electron beam and the fine wire shutter which provides the remarkable vibration sensitivity.

In the application of the device to seismographic measurements it would be desirable to mount the vibration detecting tube in a cushioned mounting having relatively high inertia. Also the coupling between the vibration responsive shutter and the earth should be sufficiently heavy and should be sufficiently damped to minimize undesirable high frequency vibrations which would provide fictitious indications.

Thus the invention disclosed comprises a novel vibration indicator and an improved method of and means for detecting and indicating either external vibrations or microwave energy propagated along a guided wave transmission system.

I claim as my invention:

1. A system for measuring microwave transmission through a waveguide including a flexible conductive section of the wall of said waveguide movable in response to microwave stresses therein, an electro-mechanical device comprising electron beam generating means, beam collecting means and beam interrupting means, and means coupling said flexible waveguide wall section to said electron beam interrupting means for moving said interrupting means relative to the path of said beam to control said beam as a function of said microwave transmission.

2. A system for measuring microwave transmission through a waveguide including a conductive diaphragm forming a portion of the wall of said waveguide and movable in response to microwave electrical stresses therein, an electro-mechanical device comprising electron beam generating means, beam collecting means and beam interrupting means, and means coupling said diaphragm to said electron beam interrupting means for moving said interrupting means relative to the path of said beam to control said beam as a function of said microwave transmission.

3. A system for measuring microwave transmission through a waveguide including an electro-mechanical device comprising an evacuated envelope, said envelope enclosing an electron source, a secondary electron-emissive anode, and a movable electron shutter element disposed between said source and said anode for selectively shielding said anode from electron irradiation, and means disposed externally of said envelope for moving said element to selectively expose said anode to said electron irradiation whereby said anode current is a function of the displacement of said externally disposed means, means for connecting said anode to an external device, a flexible conductive section of the wall of said waveguide movable in response to microwave stresses therein, and means coupling said flexible waveguide section to said externally disposed means whereby said anode current is a function of said microwave transmission.

4. A system for measuring microwave transmission through a waveguide including an electro-mechanical device comprising an evacuated envelope, said envelope enclosing an electron source, means for focusing electrons from said source to form a flat beam, an anode, a fixed apertured shielding electrode disposed between said focusing means and said anode, said electrode aperture being in the plane of said beam, a movable electron shutter element disposed between said focusing means and said apertured electrode in the plane of said beam for selectively shielding said anode from electron irradiation, and electron beam deflecting means disposed adjacent said beam between said source and said shutter element for providing adjustment of the plane of said beam, means disposed externally of said envelope for moving said element to selectively expose said anode to said electron irradiation whereby said anode current is a function of the displacement of said externally disposed means, means for connecting said anode to an external device, a flexible conductive section of the wall of said waveguide movable in response to microwave stresses therein, and means coupling said flexible waveguide section to said externally disposed means whereby said anode current is a function of said microwave transmission.

5. A system for measuring microwave transmission through a waveguide including an electro-mechanical device comprising an evacuated envelope, said envelope enclosing an electron source, means for focusing electrons from said source to form a flat beam, an anode, a fixed apertured shielding electrode disposed between said focusing means and said anode, said electrode aperture being in the plane of said beam, a movable electron shutter element disposed between said focusing means and said apertured electrode in the plane of said beam for selectively shielding said anode from electron irradiation, and electron beam deflecting means disposed adjacent said beam between said source and said shutter element for providing adjustment of the plane of said beam, and means including a flexible orming a portion of said envelope
eans disposed externally of said en-
ving said element to selectively ex-
iode to said electron irradiation
anode current is a function of the
of said externally disposed means,
nnecting said anode to an external
ible conductive section of the wall
uide movable in response to micro-
therein, and means coupling said
uide section to said externally dis-
whereby said anode current is a
id microwave transmission.

LOWELL E. NORTON.

REFERENCES CITED

The following references are of record in the file of this patent:

UNITED STATES PATENTS

| Number | Name | Date |
|---|---|---|
| 1,985,093 | Hehlgans | Dec. 18, 1934 |
| 2,290,531 | Brett | July 21, 1942 |
| 2,335,486 | Clark | Nov. 30, 1943 |
| 2,340,594 | Jonkers | Feb. 1, 1944 |
| 2,407,075 | Gurewitsch | Sept. 3, 1946 |
| 2,410,349 | Labin | Oct. 29, 1946 |

FOREIGN PATENTS

| Number | Country | Date |
|---|---|---|
| 548,681 | Great Britain | Oct. 20, 1942 |